(12) United States Patent
Thomas

(10) Patent No.: US 6,896,844 B2
(45) Date of Patent: *May 24, 2005

(54) PROCESS FOR GAS ASSISTED AND WATER ASSISTED INJECTION MOLDING

(75) Inventor: Ronald Thomas, Harrison Township, MI (US)

(73) Assignee: Cinpres Gas Injection, Ltd., Middlewich (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/435,088

(22) Filed: May 9, 2003

(65) Prior Publication Data

US 2004/0004313 A1 Jan. 8, 2004

Related U.S. Application Data

(63) Continuation of application No. 09/610,103, filed on Jun. 30, 2000, now Pat. No. 6,579,489.
(60) Provisional application No. 60/142,015, filed on Jul. 1, 1999.

(51) Int. Cl.⁷ .................................. B29D 22/00
(52) U.S. Cl. ........................ 264/570; 264/572
(58) Field of Search ................... 264/570, 572

(56) References Cited

U.S. PATENT DOCUMENTS

| | | |
|---|---|---|
| 4,740,150 A | 4/1988 | Sayer |
| 4,781,554 A | 11/1988 | Hendry |
| 4,855,094 A | 8/1989 | Hendry |
| 4,905,901 A | 3/1990 | Johnson |
| 4,943,407 A | 7/1990 | Hendry |
| 5,032,345 A | 7/1991 | Hendry |
| 5,039,463 A | 8/1991 | Loren |
| 5,047,183 A | 9/1991 | Eckardt et al. |
| 5,090,886 A | 2/1992 | Jaroschek |
| 5,118,455 A | 6/1992 | Loren |
| 5,131,226 A | 7/1992 | Hendry |
| 5,141,682 A | 8/1992 | Steinbichler et al. |
| 5,151,278 A | 9/1992 | Baxi et al. |
| 5,198,238 A | 3/1993 | Baxi |
| 5,200,127 A | 4/1993 | Nelson |
| 5,204,051 A | 4/1993 | Jaroschek |
| 5,284,429 A | 2/1994 | Schneider et al. |
| 5,295,800 A | 3/1994 | Nelson et al. |
| 5,423,667 A | 6/1995 | Jaroschek |
| 5,482,669 A | 1/1996 | Shah |
| 5,505,891 A * | 4/1996 | Shah ........................... 264/28 |
| 5,849,377 A * | 12/1998 | Horikoshi et al. ......... 428/35.7 |
| 6,579,489 B1 * | 6/2003 | Thomas ..................... 264/570 |

FOREIGN PATENT DOCUMENTS

DE 24 61 580 A1 7/1975

* cited by examiner

*Primary Examiner*—Suzanne McDowell

(57) ABSTRACT

A liquid and gas assisted injection molding apparatus comprising a source of liquid coolant, a source of compressed gas, a source of heated viscous plastic, a mold cavity means for controllably injecting said plastic into said cavity, means for controllably injecting said compressed gas into said cavity, means for controllably injecting said liquid coolant into said cavity, and means for selectively controlling the injection of said plastic, gas and liquid coolant.

10 Claims, 1 Drawing Sheet

PROCESS FOR GAS ASSISTED AND WATER ASSISTED INJECTION MOLDING

This application is a continuation of U.S. Ser. No. 09/610,103 filed Jun. 30, 2000, now U.S. Pat. No. 6,579,489, which claims benefit of Provisional Ser. No. 60/142,015, filed Jul. 1, 1999.

SUMMARY OF THE INVENTION

The present invention relates to improved processes and apparatus for the injection molding of plastic parts. By selectively injecting gas (compressible fluid) or liquid (non-compressible fluid) or a combination of the two, the molding processes can be substantially controlled to reduce cycle time, improve surface quality of the molded parts, to reduce the amount of plastic in each part, and to reduce the amount of waste plastic generated.

An additional embodiment requires a particular orientation of the mold cavity to utilize the disparity in density between liquid and gas. In this embodiment, a gaseous bubble is formed at the top of the space formed in the interior of the part, allowing that top surface to cool at a rate different from the remainder of the part, the interior of which is exposed to the liquid coolant. By controlling the volume of the liquid and the pressure of the gas introduced, the size of the bubble and the cavity pressure can be controlled, resulting in greater control of the part molding characteristics.

DESCRIPTION OF THE PREFERRED EMBODIMENT

Figure 1:
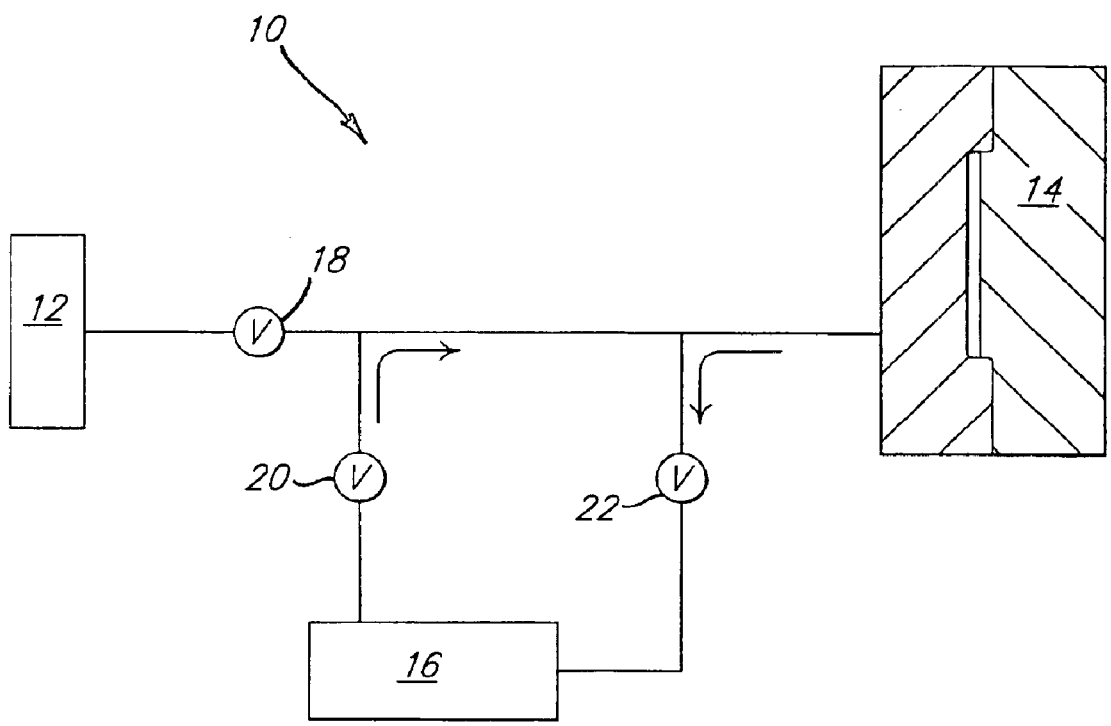
FIG. 1 is a diagrammatic view of an apparatus for injecting molding parts according to the present invention.

The present invention is a process for a combination of gas assisted and water assisted molding operation for a plastic injection molding system 10 as shown in FIG. 1. The system 10 generally includes a gas unit 12, a water unit 16, and the mold unit 14 which includes a two piece mold cavity. The gas supply unit 12 is connected via a valve 18 to the mold unit 14. The water assist unit 16 is connected via a valve 20 and valve 22 to the mold unit 14.

In operation, the molding process generally involves the injection of molten plastic into the mold unit 14 which will fill the mold cavity and will take on the shape of the cavity as the plastic cools. Opening valve 18 will allow the gas to enter the mold unit. Initially this gas (typically air or an inert gas such as nitrogen) will assist in the initial movement of the plastic into the mold 14. The gas also forms a void on the interior of the part which reduces the amount of plastic in the part, thus reducing the material cost and the weight of the part. After a predetermined amount of time, valve 18, which connects the gas unit 12 to the mold 14, is closed and valve 20 which connects the water assist unit 16 to the mold 14 is opened in order to inject a fluid (typically water) into the cavity or hollow space formed by the gas in the plastic being molded. The introduction of this water will cool the part being molded down to a predetermined temperature in a predetermined time frame. Once the desired liquid volume has been introduced, valve 20 will be closed. After valve 20 has been closed and the part being molded is sufficiently cooled, valve 22 will be open to drain the water from the mold 14. Once the water is fully drained from the mold, valve 22 is closed and the mold unit is opened up exposing the part with a smooth finish that has been made in a shorter cycle time than the original gas only assisted unit.

Additional gas can be injected during the molding process, during the liquid-aided cooling and/or after the liquid is evacuated. As the resin cools, it tends to shrink, which will reduce the volume of resin in the mold cavity, and thus reduce the cavity pressure. One advantage of gas assisted injection molding is to prevent the plastic from shrinking away from the mold cavity surface which would result in imperfections in the molded surface. Injecting additional gas during the cooling phase will maintain the cavity pressure in spite of the plastic shrinkage. Additional gas can also be injected to increase the cavity pressure once the part has begun to cool, which should provide a more uniform part thickness than injecting the high pressure gas at the onset when the plastic is the least uniform temperature. The plastic entering the cavity cools first and becomes viscous while the plastic entering the cavity later would be warmer and more fluid and thus more affected by a burst of gas. A multiple step process of introducing gas to create an internal cavity or hollow space in the part and assist in mold coverage, followed by a higher pressure introduction of gas to ensure that a uniform thickness of resin contacts the mold surface, is enabled by the use of liquid injected to facilitate a controlled and rapid cooling of the plastic resin. In addition, additional air introduced into the cavity will facilitate the draining of the fluid. Additional gas can be injected during or after fluid evacuation to blow off any fluid droplets adhering to the part interior.

Alternatively, the process can be operated utilizing a liquid such as water alone. Instead of injecting gas to assist the molding process, a liquid can be injected to increase the pressure within the mold and force the plastic to fill out the mold and create a void, the liquid will also then act to facilitate the cooling of the plastic. As the previous embodiment, gas can be injected during or after fluid evacuation if desired.

An additional embodiment of the present invention utilizes the bubble that will form if both gas and liquid are injected into the mold cavity. By selectively orienting the mold cavity the desired mold surface can be generally horizontal and at the top of the mold. In this orientation, the gas introduced will create a pocket in the part interior above any liquid introduced and against the interior of the desired surface. The size of this pocket or bubble will depend upon the volume of the liquid in the part. By selectively draining a portion of the liquid, or by selectively a desired volume of liquid injected to cool, a selected top portion of the part interior can be exposed to gas which will cool the part less quickly, giving that portion a more gradual cooling period under the influence of the gas pressure, which will yield a superior part surface finish in most applications. Alternatively, if a more rapid cooling of a particular portion of the part is desired, the cavity may be oriented so that the portion of the mold cavity is toward the bottom, and the quantity of liquid coolant selected to cover the interior of that desired part segment.

Thus, this embodiment combined the shorter cycle time of liquid cooling with the ability to cool a selected portion of the part at a more gradual rate, thus effecting a balance in reducing cycle time and yet improving surface quality of a surface where it is most desired.

By selecting the gas and fluid based upon their densities, and by selecting the orientation of the mold and location of one or more gas inlets, there are nearly endless combinations one of skill in the art could try to vary the flow of the gas along the interior of the part to vary the cooling effects. Further, depending on the shape of the part, there could be multiple pockets of gas created, which could be facilitated by multiple gas inlets. Still further, the mold cavity could be movable to facilitate the movement of the desired part section into the highest or lowest altitude.

It should be noted that the inlet and outlet valves can be operated either mechanically, electronically or by any other means commonly known. It should also be noted that a variety of coolants may be used but water is the preferred coolant.

The present invention has been described in an illustrative manner, it is to be understood that the technology which has been used is intended to be in the nature of words of description rather than of limitation. Many modifications and variations of the present invention are possible in light of the above teachings. Therefore, within the scope of the appended claims, the present invention may be practiced otherwise that as specifically described.

What is claimed is:

1. A method of injection molding plastic parts comprising:
   injecting viscous plastic into a fluid-tight mold cavity;
   injecting water through an inlet into said mold cavity to lower the temperature of said viscous plastic; and
   evacuating said water through said inlet.

2. The method of claim 1 further comprising:
   injecting compressed gas to assist in evacuating said water.

3. The method of claim 1 further comprising the evacuation of substantially all of said water in liquid form.

4. A method injection molding plastic parts comprising the steps of:
   injecting viscous plastic into a fluid tight mold cavity;
   injecting a non-compressible fluid into said mold cavity to form a hollow within said plastic; and then
   venting said mold cavity.

5. The method of claim 4 wherein gas is vented to expedite drainage of said non-compressible fluid.

6. The method of claim 4 wherein compressible fluid is injected before the injection of said viscous plastic has been completed.

7. The method of claim 4 wherein gaseous fluid is injected after the non-compressible fluid is injected.

8. A method of injection molding hollow plastic parts comprising:
   injecting viscous plastic into a fluid-tight enclosed mold cavity;
   injecting a compressible fluid into said enclosed mold cavity;
   injecting water into said enclosed mold cavity; and
   opening said mold cavity to atmosphere.

9. A method of injection molding hollow plastic parts comprising:
   closing a two-piece mold cavity to a fixed and fluid-tight condition;
   injecting viscous plastic into said mold cavity while said cavity is fixed and fluid-tight; and
   injecting an aqueous solution into said viscous plastic to create a hollow within said plastic.

10. A method of injection molding a plastic part comprising:
    closing a two-piece cavity having an interior mold surface;
    injecting a quantity of fluent plastic into said mold cavity;
    injecting an aqueous fluid into said fluent plastic, said aqueous fluid assisting in the movement of said fluent plastic to cover said mold cavity surface;
    allowing said fluent plastic to cool into a self-supporting part; and
    opening said mold cavity.

* * * * *

(12) EX PARTE REEXAMINATION CERTIFICATE (10415th)
United States Patent
Thomas

(10) Number: US 6,896,844 C1
(45) Certificate Issued: *Nov. 24, 2014

(54) PROCESS FOR GAS ASSISTED AND WATER ASSISTED INJECTION MOLDING

(75) Inventor: Ronald Thomas, Harrison Township, MI (US)

(73) Assignee: Cinpres Gas Injection Ltd., Middlewich (GB)

Reexamination Request:
No. 90/012,811, Mar. 20, 2013
No. 90/013,056, Nov. 13, 2013

Reexamination Certificate for:
Patent No.: 6,896,844
Issued: May 24, 2005
Appl. No.: 10/435,088
Filed: May 9, 2003

(*) Notice: This patent is subject to a terminal disclaimer.

Related U.S. Application Data

(63) Continuation of application No. 09/610,103, filed on Jun. 30, 2000, now Pat. No. 6,579,489.

(60) Provisional application No. 60/142,015, filed on Jul. 1, 1999.

(51) Int. Cl.
*B29C 45/17* (2006.01)

(52) U.S. Cl.
CPC .......... *B29C 45/1704* (2013.01); *B29C 45/1706* (2013.01)
USPC ........................................... 264/570; 264/572

(58) Field of Classification Search
None
See application file for complete search history.

(56) References Cited

To view the complete listing of prior art documents cited during the proceedings for Reexamination Control Numbers 90/012,811 and 90/013,056, please refer to the USPTO's public Patent Application Information Retrieval (PAIR) system under the Display References tab.

*Primary Examiner* — Carlos Lopez

(57) ABSTRACT

A liquid and gas assisted injection molding apparatus comprising a source of liquid coolant, a source of compressed gas, a source of heated viscous plastic, a mold cavity means for controllably injecting said plastic into said cavity, means for controllably injecting said compressed gas into said cavity, means for controllably injecting said liquid coolant into said cavity, and means for selectively controlling the injection of said plastic, gas and liquid coolant.

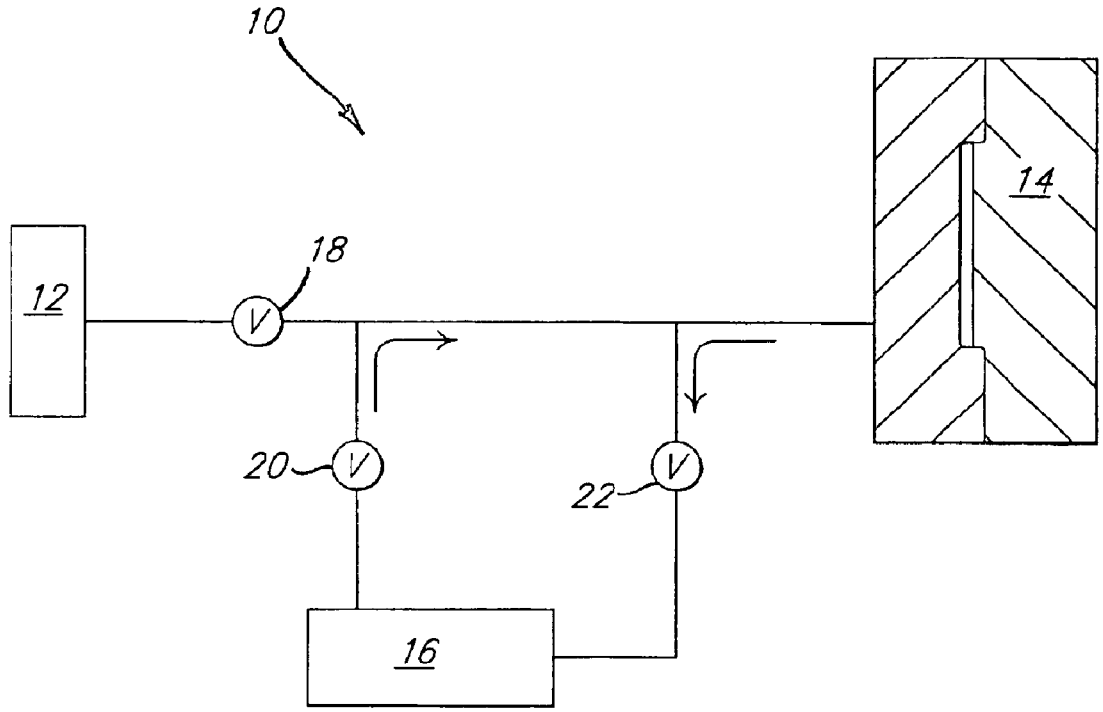

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 4 and 9 are cancelled.

Claims 1-3, 5-8 and 10 were not reexamined.

\* \* \* \* \*